(12) United States Patent
Kawamoto et al.

(10) Patent No.: US 6,289,157 B1
(45) Date of Patent: Sep. 11, 2001

(54) OPTICAL WAVE-GUIDE, LIGHT-BEAM SPOT CONVERTER AND OPTICAL TRANSMISSION MODULE

(75) Inventors: Kazumi Kawamoto; Hiroaki Furuichi, both of Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/492,084

(22) Filed: Jan. 27, 2000

(30) Foreign Application Priority Data

Jan. 26, 1999 (JP) .................................................. 11-016588

(51) Int. Cl.$^7$ ...................................................... G02B 6/02
(52) U.S. Cl. ............................................ 385/123; 385/124
(58) Field of Search .................................... 385/123, 122, 385/124, 14, 15

(56) References Cited

U.S. PATENT DOCUMENTS 4,892,375 * 1/1990 Chikuma et al. ...................... 385/33
5,175,788 * 12/1992 Miura et al. ..................... 385/124 X

OTHER PUBLICATIONS

"A Very Short Planar Silica Spot–Size Converter Using a Nonperiodic Segmented Waveguide", Journal of Lightwave Technology, vol. 16, No. 9, pp. 1680–1685, Sep.

* cited by examiner

Primary Examiner—Phan T. H. Palmer
(74) Attorney, Agent, or Firm—Antonelli, Terry, Stout & Kraus, LLP

(57) ABSTRACT

Utilizing propagation of light along with a region of high refractive index, an enlargement and a reduction of an optical beam-spot are achieved by a plurality of layers of the cruds, in which relationships in magnitude of the refractive index are defined with respect to a segment-like core.

16 Claims, 7 Drawing Sheets

X-Y CROSS-SECTION

Y-Z CROSS-SECTION AT X=0

X-Y CROSS-SECTION

Y-Z CROSS-SECTION AT X=0

OPTICAL WAVE-GUIDE, LIGHT-BEAM SPOT CONVERTER AND OPTICAL TRANSMISSION MODULE

BACKGROUND OF THE INVENTION

The present invention mainly relates to an optical transmission module for use in an optical transmission system or an optical exchange system, and in particular relates to an optical coupling technology, such as an optical wave-guide, a light-beam spot converter and so on, for obtaining an optical coupling with a high efficiency, for instance, between a light emitting or light receiving element and an optical fiber, a light emitting or light receiving element and an optical circuit in the optical transmission module, and/or between the optical circuit and the optical fiber, as well as for obtaining easy install and manufacture thereof.

With development of an optical information transmission path or network, a plan of applying an information transmission with use of an optical fiber was made, not only for use in a business building for various industries, but also into a condominium and/or a separated house or building. One of the important problems therein, needless to say, but is in lowering of a price for such the optical transmission system, in particular the lowering of the price of the optical transmission module, which is connected to a general subscriber at a terminal. For the purpose of great reduction of the cost of the optical transmission module for the subscriber, in recent years, an attempt was made of putting a semiconductor laser having a converter of a light beam-spot diameter into practical use. This is an attempt to aim the low cost of it by means of a method for mounting an optical device(s) or element(s) on a single or a one flat surface and of removal of lenses, and can be understood or interpreted to let the semiconductor laser to own a lens function by itself, so as to remove the lens therefrom. This converter of the light beam-spot diameter, i.e., as a magnifier for the light beam-spot diameter, does not necessarily have a sufficient performance or power in the lens function, however the light beam after emission is narrowed in an extent thereof, thereby improving the optical coupling directly to the optical fiber, or the like, comparing to that of the laser device of the conventional type. As a result of this, the optical module can be assembled with ease and the mounting thereof also can be simplified, thereby advancing the attempt of the reduction in manufacturing cost by a one step.

SUMMARY OF THE INVENTION

However, in the converter for the light beam-spot diameter according to the conventional art, there was applied or practiced a technology of selective crystal growth, for the purpose of shaping an edge of a core portion at an emission side thereof in a taper-like. Providing the converter of the light beam-spot diameter inside or outside of the laser resonator, however, in both cases, it comes to bring about problems, such as giving an influence onto optimal designing of the laser itself, or making an effect due to an error(s) in manufacturing process thereof to a lasing ability sensitive. Because of those reasons, a yielding rate in manufacturing the conventional type laser is deteriorated or lowered, and then it rises up the price of the laser itself, thereby coming to be a main cause or factor of deceleration in progress of the steps for the cost reduction of the optical transmission module.

A limit in the magnification of the spot diameter by means of the shaping in the taper-like with use of the technology of selective crystal growth, at the present situation, is ten (10) degree or more or less, being expressed by a radiation angle of far-field pattern with the Gauss beam approximation. Therefore, even in a case of applying a laser having the magnifier of the light beam-spot diameter, further inventions and/or innovations are necessary in relation to novel technologies on the optical coupling, other than those on the semiconductor laser, for the purpose of increasing the optical coupling efficiency and of further facilitating the fabrication thereof. On a while, explaining by use of a coordinate system which is used in the description of the present invention, the conversion of the light beam-spot is relatively easy only in a direction of y axis, but is rather difficult in a direction of x and also in the both directions x and y thereof. Theoretically, it can be realized by tapering the core in the direction of x axis and it was also actually practiced by using such the method on the semiconductor laser, however it necessitates the selective crystal growth technology as mentioned in the above. Therefore, it is difficult to introduce the method onto an optical wave-guide path of quartz as it is, for example, it cannot be said that it is a general method which can be applied to for realizing it cheaply. Also, as an other conventional art method for magnifying the diameter of the beam-spot in the both directions of the x axis and y axis, there was also known a method, in which the core is continuously enlarged or magnified in the diameter thereof, by heating the edge portion of the optical wave-guide path formed on a substrate made of silicon or glass, so as to thermally diffuse dopant in the core portion thereof. However, it is extremely difficult to conduct such the thermal diffusion only onto the edges of the optical wave-guide paths if they are provided in a plurality number thereof on a one (1) wafer, therefore it cannot be said to be a method being high in productivity, nor to be a means being suitable for the cost reduction.

Further in the semiconductor laser of an alley type, the practical use of the laser having the converter of the light beam-spot diameter itself is not achieved nor realized yet, and with a parallel optical transmission module with use of such the alley-type semiconductor laser, it is necessary to introduce an micro-lens array, etc., thereby making it further difficult the lowering of price of the parallel optical transmission module.

Also, with a module comprising an optical circuitry which is achieved by an optical wave-guide provided between the semiconductor laser and the optical fiber, it is impossible to optimize both the optical couplings between the semiconductor laser and the optical circuitry and between the optical circuitry and the optical fiber at the same time, not so far as the radiation angle of the far-field pattern of the semiconductor laser is nearly equal to that of the optical fiber, therefore there is a problem that the optical circuitry must be designed under a condition of making sacrifices for the respective optimizations thereof. Alternatively, on the contrary to that, there is also a problem that there must be scarified a subject, such as small-sizing of the optical circuitry, for giving the priority the efficiency of optical coupling.

An object of the present invention, therefore, for dissolving the problems mentioned above, is to provide a cheap and small-sized optical wave-guide and an optical beam-spot converter, which can be provided voluntarily between optical parts relatively.

Also, an other object of the present invention is to provide an optical wave-guide and an optical beam-spot converter, which can be realized by an extremely simple process, thereby obtaining lowering of the price therefor.

A further other object of the present invention is to provide an optical transmission module for realizing the ideal optical couplings between both ends of the optical circuitry composed of the optical wave-guide(s) and the optical element(s) and the optical fiber(s), respectively, thereby achieving an improvement on utilization efficiency of light and on easiness or facility in the fabrication thereof.

Moreover, a further other object of the present invention is to provide an optical transmission module, in which an optical beam-spot converter can be easily manufactured on a substrate, on which the optical circuitry and the optical element(s) are mounted, thereby obtaining the lowering of the price therefor.

According to the present invention, for resolving the above-mentioned problems, there is provided an optical wave-guide having a z axis as an optical axis in a direction of propagation of light, a x axis in a vertical direction on a cross-section being perpendicular thereto, and a y axis in a horizontal direction, comprising:
   a core portion being formed so that a light is transmitted in the direction of the z axis, around at a center of an origin of said x axis and said y axis; and
   a crud layer surrounding said core portion and being lower in refractive index than that of said core portion, and being constructed with at least two layers, being different in refractive indexes thereof, which are in contact with each other on a boarder laying on a x coordinate in a positive or a negative region thereof but not the origin, wherein
      said core portion is formed discontinuously in the direction of said optical axis.

Also, according to the present invention, there is provided an optical wave-guide having a z axis as an optical axis in a direction of propagation of light, a x axis in a vertical direction on a cross-section being perpendicular thereto, and a y axis in a horizontal direction, comprising:
   a core portion being formed so that a light is transmitted in the direction of the z axis, around at a center of an origin of said x axis and said y axis; and
   a crud layer surrounding said core portion and being lower in refractive index than that of said core portion, and being constructed with at least two layers, being different in refractive indexes thereof, which are in contact with each other on a boarder laying on a x coordinate in a positive or a negative region thereof but not the origin, wherein
      said core portion is formed discontinuously in the direction of said optical axis, with varying a width of the core and a length of the core in the direction of the optical axis, and also a length of a portion of the core which is removed, non-cyclically.

Further, according to the present invention, there is also provided an optical beam-spot converter, including an optical wave-guide having a z axis as an optical axis in a direction of propagation of light, a x axis in a vertical direction on a cross-section being perpendicular thereto, and a y axis in a horizontal direction, comprising:
   a core portion being formed so that a light is transmitted in the direction of the z axis, around at a center of an origin of said x axis and said y axis; and
   a crud layer surrounding said core portion and being lower in refractive index than that of said core portion, and being constructed with at least two layers, being different in refractive indexes thereof, which are in contact with each other on a border laying on a x coordinate in a positive or a negative region thereof but not the origin, wherein
      said core portion is formed discontinuously in the direction of said optical axis, whereby varying an optical beam-spot.

Furthermore, according to the present invention, there is also provided an optical beam-spot converter, including an optical wave-guide path having a z axis as an optical axis in a direction of propagation of light, a x axis in a vertical direction on a cross-section being perpendicular thereto, and a y axis in a horizontal direction, comprising:
   a core portion being formed so that a light is transmitted in the direction of the z axis, around at a center of an origin of said x axis and said y axis; and
   a crud layer surrounding said core portion and being lower in refractive index than that of said core portion, and being constructed with at least two layers, being different in refractive indexes thereof, which are in contact with each other on a border laying on a x coordinate in a positive or a negative region thereof but not the origin, wherein
      said core portion is formed discontinuously in the direction of said optical axis, with varying a width of the core and a length of the core in the direction of the optical axis, and also a length of a portion of the core which is removed, non-cyclically, whereby varying an optical beam-spot.

Also, according to the present invention, the optical wave-guide or the optical beam-spot converter as defined in the above, wherein a portion of said core portion is enlarged in the direction of the y axis so as to form the core portion in a rib type.

Further, according to the present invention, the optical wave-guide or the optical beam-spot converter as defined in the above, wherein a lower portion of said core portion is enlarged in the direction of the y axis so as to form the core portion in a rib type, and a refractive index of a lower crud layer which positions at a lower portion side of the core portion is smaller than that of an upper crud layer which positions at an upper portion side of the core portion.

Further, according to the present invention, the optical wave-guide or the optical beam-spot converter as defined in the above, wherein on a cross-section of the optical axis, a core member is further provided in vicinity of the core portion, which is made of a material same to the core portion or of a material having a refractive index about similar thereto, and which is formed by extending in the direction of the y axis with a thickness being thinner than that of the core portion.

Further, according to the present invention, the optical wave-guide having a crud portion and a core portion, wherein the pattern of the core portion is made in a specific shape, thereby achieving the function of the optical beam-spot conversion by using only a phenomenon of transmission of light in a case where the refractive index of the crud portion is set to be a specific value. Namely, according to the present invention, there is provided the optical beam-spot converter, wherein the core is made discontinuous for the purpose of small-sizing, and the crud layer is constructed with at least two layers being different in the refractive index to each other for the purpose of beam-spot conversion in the x axis direction, thereby achieving those by combining the relationship in magnitude of the refractive index within the crud layer and the discontinuous core configuration thereof.

Further, according to the present invention, the optical wave-guide or the optical beam-spot converter as defined in the above, wherein on a cross-section of the optical axis, a refractive index of a lower crud layer which positions at a lower portion side of the core portion is smaller than that of an upper crud layer which positions at an upper portion side of the core portion, and a core member is embedded into said lower crud layer in vicinity of the core portion, which is made of a material same to the core portion or of a material having a refractive index about similar thereto, and which is formed by extending in the direction of the y axis with a thickness being thinner than that of the core portion.

Further, according to the present invention, there is provided an optical transmission module comprising: a light emitting element or an light emitting element and an optical fiber, and further comprising the optical wave-guide mentioned in the above, being provided with the light emitting element or between the light emitting element and the optical fiber.

And, further, according to the present invention, there is provided an optical transmission system comprising the optical transmission module mentioned in the above, whereby an information is transmitted by means of said optical transmission module.

As is explained in the above, with the construction mentioned in the above, it is possible to realize a small-sized optical beam-spot converter with low cost of manufacturing, independent upon the light emitting element, such as the semiconductor laser or the light receiving element.

Also, with such the construction mentioned in the above, the small-sized optical beam-spot converter can be achieved, in particular with the optical transmission module containing the optical circuit therein, which can operate independently or even if it is connected to both input and output portions of the optical circuit or either one thereof, or alternatively which can be manufactured with the optical circuit as is a form of a one body or unit, and which can optimize the optical coupling at the input and output portions independently and respectively, thereby realizing the optical transmission module with high performances and a low price.

DETAILED DESCRIPTION OF PREFERRED EMBODIMENTS

Figure 1A:
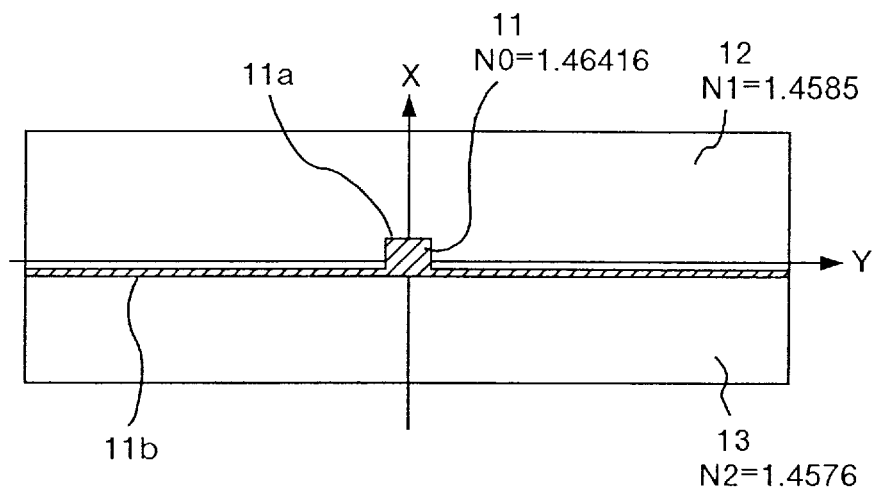
FIGS. 1(a) and (b) show a cross section view and a plane view of showing a first embodiment of an optical beam-spot converter (or, optical wave-guide), according to the present invention.

Hereinafter, embodiments, including an optical wave-guide, an optical beam-spot converter and an optical transmission module, according to the present invention, will be fully explained by referring to the attached drawings.

First of all, a basic idea or way of thinking and a principle laying behind the present invention will be explained.

In general, since a single mode path is used as the optical wave-guide, a cross-section area of a core is small, and a difference between the core and a crud in the reflective index thereof, as well. Since the core cross-section area is small, an emission light from the optical wave-guide is extended in a large angle due to the diffraction, therefore an efficiency in an optical coupling between other optical part(s) is decreased down, and also is necessitated an assembling of the optical part(s), being extremely high in accuracy. Accordingly, the most important subject for lowering the manufacturing cost thereof is to reduce the extent in spreading of the emission light, and therefore studies are made eagerly for expanding a light beam-spot within the optical wave-guide, in recent years. In this manner, since the basic subject is the expansion or enlargement of the beam-spot for the bean-spot conversion, therefore explanation will be given on the bean-spot conversion, here.

In the optical wave-guide path, light transmit with a mode being inherent to the optical wave-guide, and there are two (2) methods for expanding or enlarging the mode diameter thereof. A first one is a method of enlarging the core cross-section area, in which the mode diameter is expanded along with the enlarged core. A second one is, on the contrary to this, a method of reducing or shrinking the core cross-section area, with which an enclosure of the light within the core becomes weak when the core diameter is small while a leakage of the light outside the core becomes large, and as a result the mode diameter is enlarged or expanded.

By the way, changing or modifying the shape of the core is possible by means of only mask designing, if it is in the direction of y axis, however it is not easy if in the direction of x axis. For the latter, there is a necessity of applying a special method or technology, such as the selective crystal growth mentioned in the above.

Then, an aspect aimed at, being characterized according to the present invention, is to enable to enlarge the beam-spot diameter in the direction of x axis, without modifying the core shape in the direction of x axis.

According to the present invention, for achieving the first aspect aimed at, it is accomplished by construction of combining the principles mentioned above. Namely, a first constructive element, according to the present invention, is in that, as is shown in FIGS. 1 and 3, a region is formed for weakening the enclosure of light directing to a core 11a (31), and the cruds 12 and 13 (32 and 33) are constructed with a plurality of layers having the different refractive indexes as well. With such the structure, the light which leak outside the core because of the weak enclosure is pulled or drawn toward a side of the crud 12 (32) having the high refractive index. While, pulling toward a side reverse to the y axis is achieved by elongating the core 11b (34) at the side facing on the crud layer having the low refractive index into the y direction, i.e., by making a rib-type core 11b. With those, it is possible to make the enlargement of the beam-spot in the x direction, without introducing the special processes nor great increase in the number of steps in manufacturing thereof. It is, namely, carried out by obtaining a concept that, for weakening the enclosure of light partially, a portion of the core 11a (31) is removed in a direction of an optical axis and it is embedded with the crud material 12 (32), i.e., by forming a core of a segment-type.

This is also an important means for achieving a second feature, i.e., small-sizing (shortening) of the optical beam-spot converter.

Figure 1B:
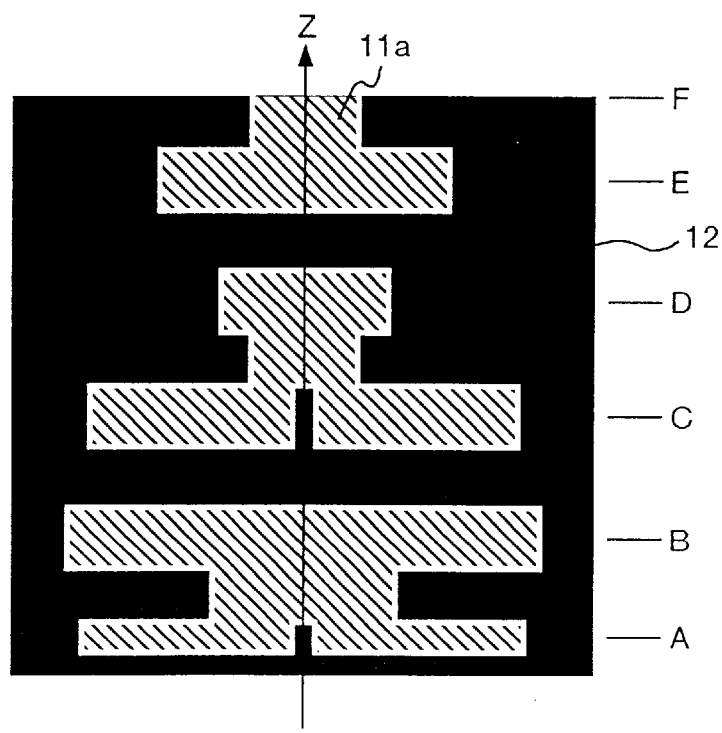

FIGS. 1(a) and (b) show a first embodiment of a small-sized optical beam-spot converter according to the present invention, being designed upon a basis of a simulation conducted on the basic idea mentioned in the above. FIG. 1(a) shows a cross-section and FIG. 1(b) a y-z plane view thereof. However, the view in FIG. 1(b) is enlarged ten (10) times in the y axis, therefore a length of 10 $\mu$m in the y direction is equal to 100 $\mu$m in the z direction. Also in this example, the refractive index N0 of the core 11 is 1.46416 (N0=1.46416), that of the first crud 12 is 1.4586 (N1= 1.4586), and that of the second crud 13 is 1.4576 (N1= 1.4576), respectively. In this manner, a portion of the core 11a is removed in the direction of optical axis and is embedded with the crud material 12, i.e., by forming the so-called segment-type core, so as to form the region for weakening the enclosure of light directing to the core 11a (31), and the core at the side facing on the crud layer is elongated in the direction of y axis, i.e., by forming the so-called rib-type core 11b, thereby constructing the first crud 12 and the second crud 13 with the plurality of layers having the different refractive indexes (N1 and N2). With such the structure, the light leaking outside the core because of the weak enclosure is pulled or drawn toward the side of the crud 12 having the high refractive index, while the pulling toward the reverse side with respect to the y axis is achieved, thereby enabling to enlarge the beam spot not only in the direction of y axis, but also in the direction of x axis. Further, it is so constructed that the refractive index of the core 11 is higher than those of the first and the second cruds a little bit. And, also the refractive index of the first crud 32 is higher than that of the second crud 33 a little bit.

Figure 2A:
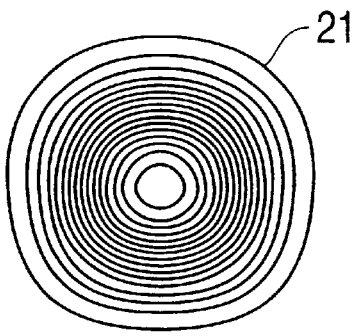
FIGS. 2(a) to (f) show contours of beam strengths of lights for showing a function in the first embodiment of the optical beam-spot converter (or, optical wave-guide), according to the present invention.
Figure 2D:
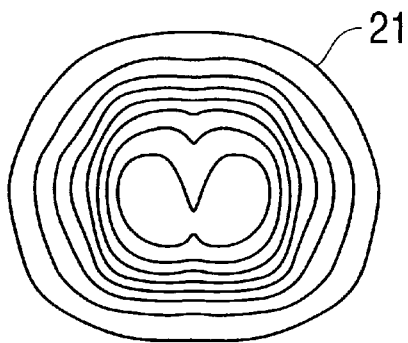
Figure 2B:
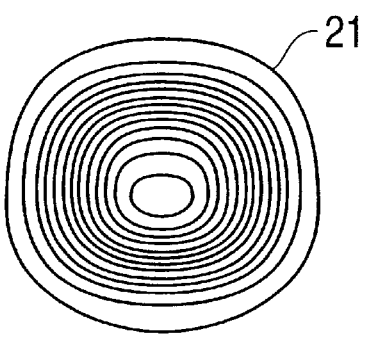
Figure 2E:
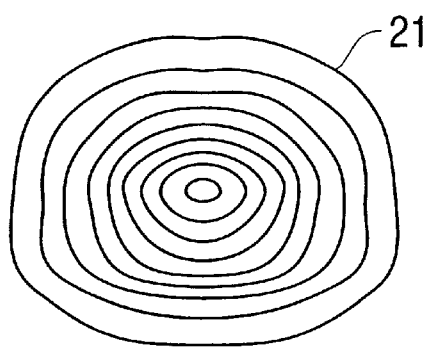
Figure 2C:
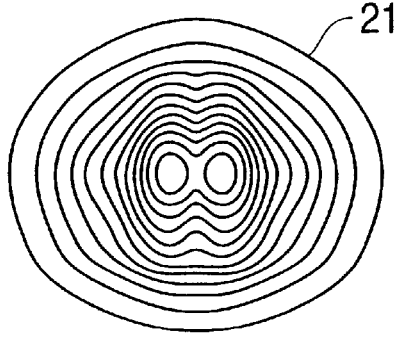
Figure 2F:
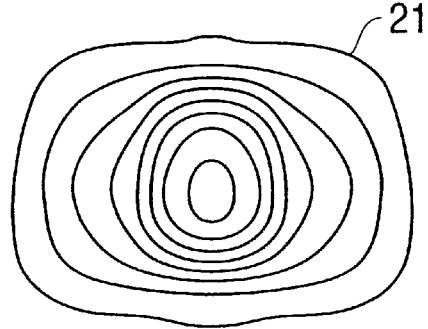

FIGS. 2(a) to (f) show a capacity of enlargement of the light beam-spot in the present embodiment, in which the light strengths in a x-y section are indicated by contours 21. FIG. 2(a) shows the light strengths when a wave-guide light is incident upon the optical beam-spot converter of the present embodiment from an entrance or input edge shown in FIG. 1(b), and FIGS. 2 (b) to (e) show the light strengths at positions from A to E, each located at a distance 20 $\mu$m therebetween. FIG. 2(f) shows the light strength at the position F of a distance 100 $\mu$m from the entrance edge. From those, it can be seen that the light is enlarged in the beam diameter accompanying propagation thereof. Further, for the calculation of this, three (3) dimensional FD (Finite Difference)-BPM (Beam Propagation Method) is used.

Figure 3A:
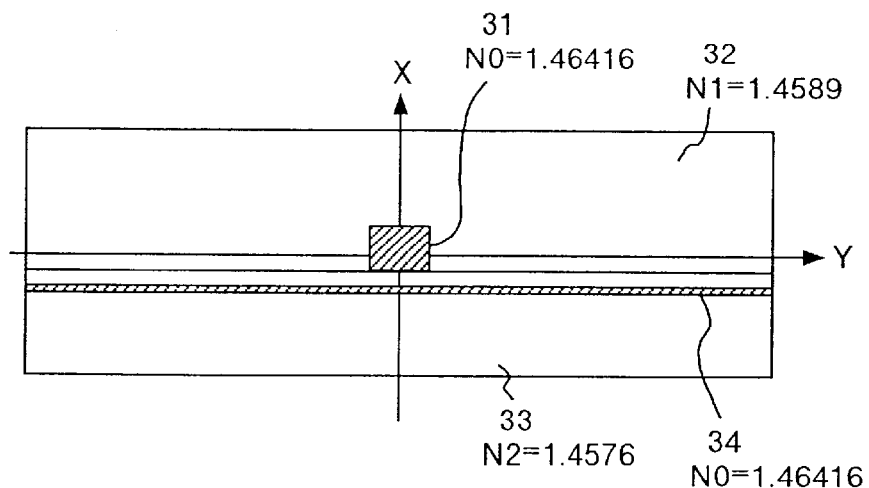
FIGS. 3(a) and (b) show a cross section view and a plane view of showing a second embodiment of an optical beam-spot converter (or, optical wave-guide), according to the present invention.
Figure 3B:
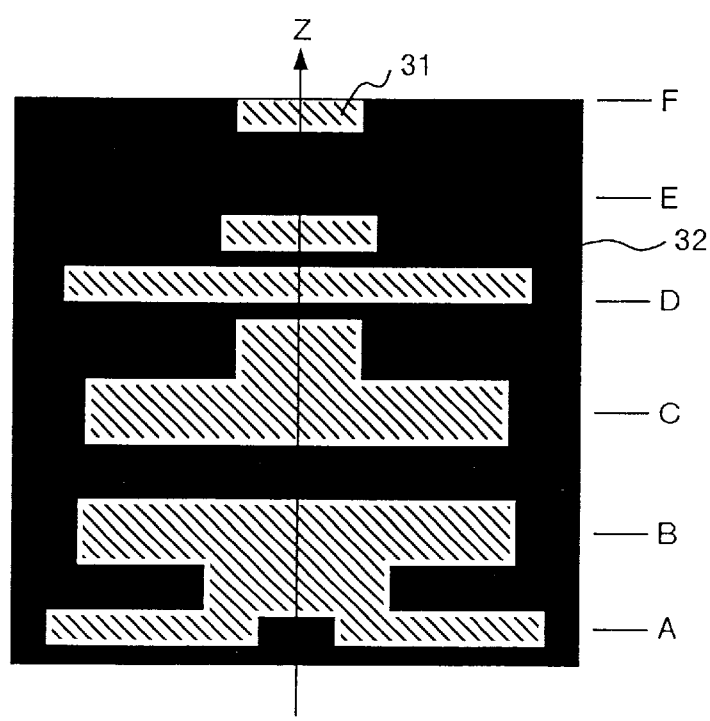
Figure 4A:
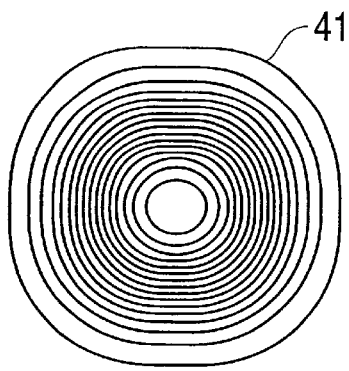
FIGS. 4(a) to (f) show contours of beam strengths of lights for showing a function in the second embodiment of the optical beam-spot converter (or, optical wave-guide), according to the present invention.
Figure 4B:
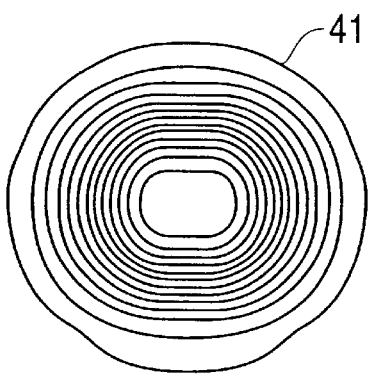
Figure 4C:
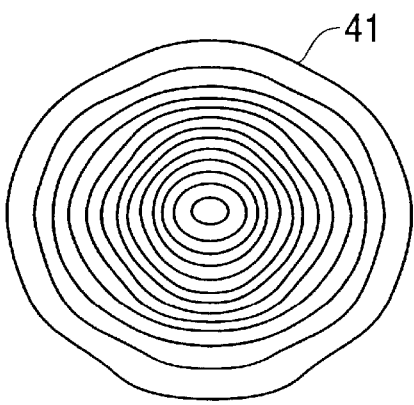
Figure 4D:
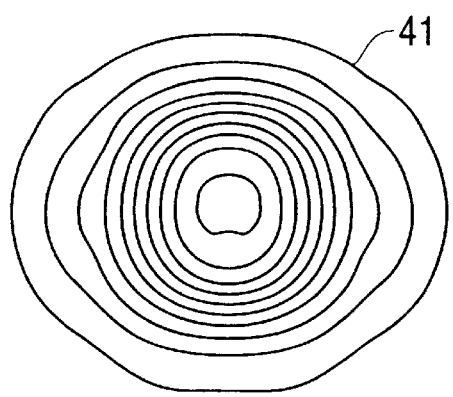
Figure 4E:
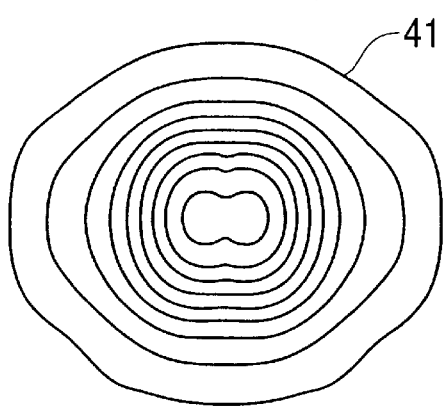
Figure 4F:
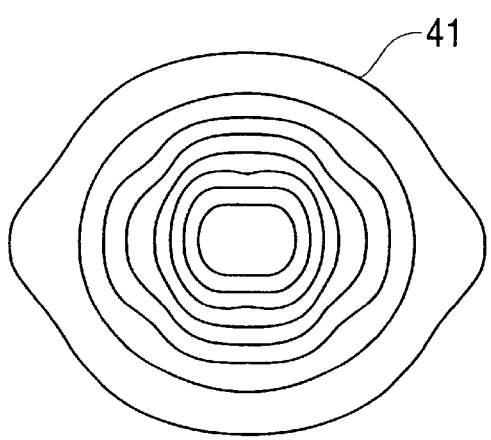

FIGS. 3(a) and (b) show a second embodiment of a small-sized optical beam-spot converter according to the present invention, wherein in the place of the rib-type core 11b according to the first embodiment, a thin film, being formed of the material of the core 34 which has a large refractive index, is put inside the second crud layer 33, and further upon thereof is formed a core 31 having a rectangular cross section. This is shown with use of the cross section view of FIG. 3(a). And, FIG. 3(b) is also the y-z plane view of showing the second embodiment at x=0, in the same manner to the FIG. 1(b). The refractive indexes of them are same to those in the first embodiment, i.e., those of the high refractive index layer 34 and the core 31 are same, N3=N0= 1.4576, that of the first crud 32 is (N1=) 1.4589, and that of the second crud is (N2=) 1.4576, as is same in the first embodiment. In this manner, a portion of the core 11a is removed in the direction of optical axis and is embedded with the crud material 12, i.e., by forming the so-called segment-type core, so as to form the region for weakening the enclosure of light directing to the core 31, and the thin film-like core elongated in the direction of y axis and embedded within the crud layer 33 having the low refractive index, thereby constructing the first crud 12 and the second crud 13 with the plurality of layers having the different refractive indexes (N1 and N2). With such the structure, the light leaking outside the core because of the weak enclosure are pulled or drawn toward the side of the crud 32 having the high refractive index, while the pulling toward the reverse side with respect to the y axis is achieved by the thin film-like core 34, thereby enabling to enlarge the beam spot not only in the direction of y axis, but also in the direction of x axis. Further, the core material 34 may be made of the same material of the core 31 and has the refractive index same thereto, or may be made of other material having an about same refractive index. However, both the core 31 and the core material 34 are set to be higher than those of the first and the second cruds a little bit. And, also the refractive index of the first crud 32 is higher than that of the second crud 33 a little bit.

FIGS. 4(a) to (f) show a capacity of enlargement of the light beam-spot in the second embodiment, in which the light strengths in the x-y section are indicated by contours 41, as in the FIGS. 2(a) to (f). The FIGS. 4(a) to (e) show the light strengths at positions from A at 5 $\mu$m from the entrance edge, to E, each located at a distance 20 $\mu$m therebetween, in the same manner as in FIGS. 2(a) to (e). Also, FIG. 2(f) shows the light strength at the position F of a distance 100 $\mu$m from the entrance edge, as in the FIG. 2(f).

In both the first embodiment and the second embodiment, a rate of enlargement or magnification for the beam-spot can be selected within a certain extent or range when designing the shape of the core in the selection range, i.e., the longer the length of the element, the larger the diameter thereof. However, what is given here is an example, in which a shortness of only 100 $\mu$m can satisfies a requirement for the moment, i.e., enabling the enlargement of the beam-spot.

Next, a manufacturing method of the small-sized optical beam-spot converter, according to the present invention, will be explained by referring to FIGS. 5(a) to 5(e). FIGS. 5(a) to 5(e) are cross-section views for showing the manufacturing processes of the first embodiment, i.e., the small-sized optical beam-spot converter according to the present invention, shown in the FIGS. 1(a) and (b).

First of all, on a substrate of glass or Si (silicon) is formed an optical wave-guide, by use of quartz or the like or an organic material, in the same manner of the optical wave-guide of the conventional art. For example, explaining on a case of a quartz converter in which is used a substrate 55 made of quartz, a basis is forming of a film of quartz or the like by a method of CVD (Chemical Vapor Deposition), EB (Electron Beam) evaporation, or a flame deposition method, in the manner being totally same to the manufacturing of the optical wave-guide of quartz.

Figure 5A:
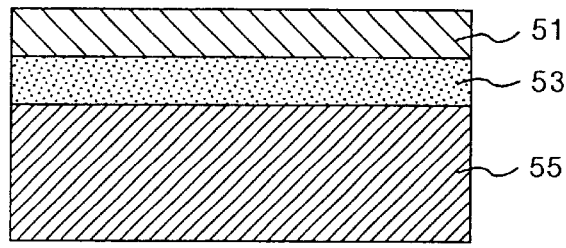
FIGS. 5(a) to (e) show manufacturing processes of the first embodiment of the optical beam-spot converter (or, optical wave-guide), according to the present invention.
Figure 5B:
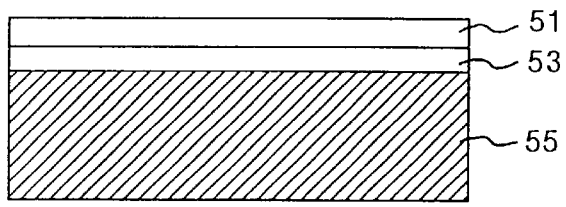

FIG. 5(a) shows a method of the flame deposition, wherein the second crud layer 53 and the core layer 51 are deposed or piled upon the Si substrate 55, in the form of glass particle which can be obtained through hydrolysis within oxide hydrogen flame of the material. However, the concentration of dopant, such as titan oxide or germanium oxide, is set to be high in the core layer 51. Next, as shown in FIG. 5(b), the layers 51 and 53 of the glass particle are heated under a high temperature in an electric furnace to be turned transparent or clear. In general, the deposition and clarification on the glass particle 51 and 53 are conducted for each of the crud layer 53 and the core crud 51, separately, however there is shown a case where they are performed at the same time. Further, by making the glass particle 53, then the second crud layer 13 (for example, the refractive index N2=1.4576) is formed thereon.

Figure 5C:
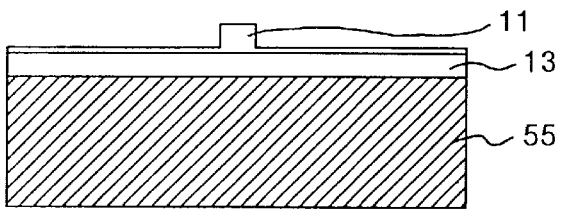

Following to the above, as shown in FIG. 5(c), patterning of the core layer 51 is performed with use of a photolithography. Namely, after application of a resist and then transcription of a mask pattern thereon, etching process is treated by RIE (Reactive Ion Etching) at a predetermined depth, thereby to form the rib-type core 11 (for example, the refractive index N0=1.46416) as shown in the FIGS. 1(a) and (b).

Figure 5D:
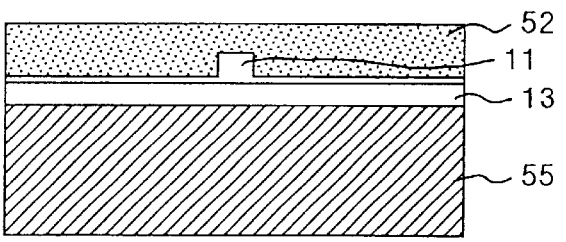
Figure 5E:
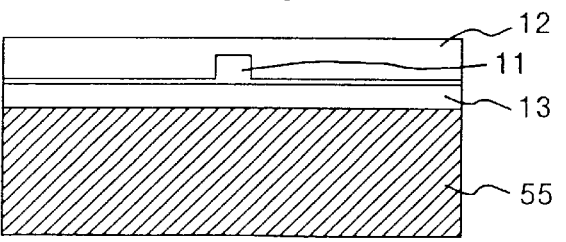

Thereafter, the first crud layer 52, the refractive index of which is adjusted or modulated by an amount of the dopant as shown in FIG. 5(d), is deposed thereon if a form of the glass particle, and further it is heated under the high temperature to be turned transparent as shown in FIG. 5(e), thereby forming the first crud layer 12 which is higher than the second crud layer 13 a little bit in the refractive index (for example, the refractive index N1=1.4585). When using a material of quartz or the like, it is common to add a supplemental dopant a little bit so as to adjust the glass softening temperature and thermal expansion rate thereof.

As is explained in the above, the small-sized optical beam-spot converter as the first embodiment according to the present invention will be formed or constructed on the substrate 55 of Si or the like.

The manufacturing processes of a second embodiment of the small-sized optical beam-spot converter according to the present invention shown in FIG. 3 are also almost similar to those of the first embodiment, although the number of processes is increased by those for forming the films, in relation to the fact that the core 31 and the thin film core 34 are separated to each other by a little bit, therefore explanation of it will be omitted here.

Figure 6:
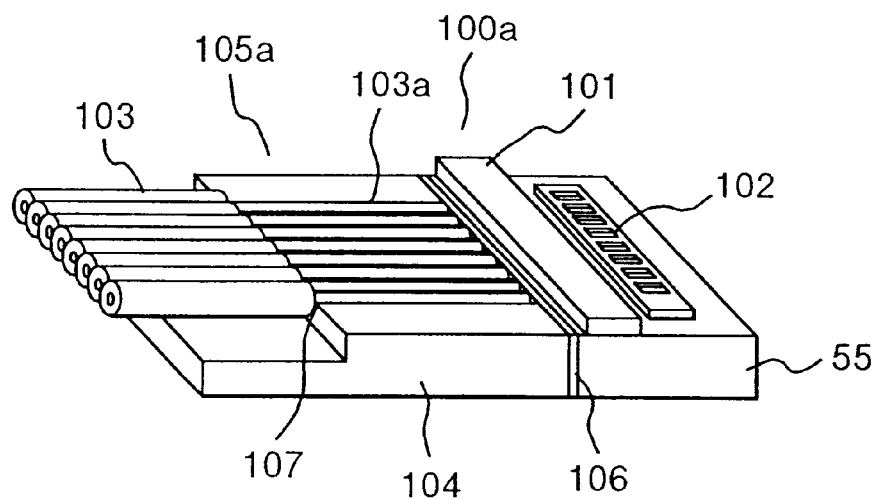
FIG. 6 shows a perspective view of a first embodiment of a parallel optical transmission module, according to the present invention.

Next, explanation will be given on an embodiment of a parallel optical transmission module comprising the small-sized optical beam-spot converter according to the present invention. FIG. 6 shows a concept of a first embodiment of the parallel optical transmission module, in which is applied the optical element of allay-type according to the present invention. The optical beam-spot converter 101 is formed on the substrate 55 of Si or the like, and thereafter are formed a metallizing (not shown in the figure) for soldering connection of the optical element(s) 102 at an incident side edge and an alignment mark(s) (not shown in the figure) for alignment or positioning thereof. Also, the alignment mark is formed on the optical element 102 in advance, then they are adjusted in the position upon the basis of those marks, i.e., a passive alignment method, so that the optical element (s) 101 is connected onto the substrate 55 of Si or the like through a solder being molted by heating. The solder is evaporated and doped upon an either side of the substrate 55 or the element 102 with thickness of several $\mu$m for patterning, for forming a solder film pattern. Further, on the substrate 55 of Si or the like is formed electrical wiring for inputting signals to the optical element 101. Also, on this substrate 55 may be mounted an IC device(s) 252 (shown in FIG. 8) for amplifying and coding a transmission signal to be inputted into the optical element 101.

Optical fibers 103 (each having an outer diameter of about 125 $\mu$m) are aligned on the substrate 104 of glass or Si, and the cores 103a thereof, each having a diameter of about 8 $\mu$m, are embedded into grooves of V-shape formed on the substrate and covered by a protection plate (not shown in the figure), thereby forming a block 105a of the optical fiber bundle (i.e., a multi-core optical connector portion). This block 105a of the optical fiber bundle (i.e., the multi-core optical connector portion) and the substrate 55, on which the above-mentioned optical element 102 and the optical beam-spot converter 101 are mounted, are adjusted in the position thereof by means of a passive alignment or an active alignment method, and then are bonded or connected with use of an adhesive 106 so as to complete the parallel optical transmission module 100a. With the active alignment, basically, they are aligned by using the channels at both ends thereof, however they also may be aligned with use of the central channels in the place thereof, therefore there is no necessity to restrict the method only to a specific one. The adhesive 106 may be of a UV (ultraviolet curable) type or a thermal curable type, however it is needless to say that it is preferable to use the adhesive which is small in deformation when being cured and has a high reliability.

In this manner, the light emitted from each optical element (light emitting element) 101 is incident upon the core 11a or 31, which is equal or less than about 10 tm of the optical beam-spot converter 101, and propagates in the Z direction as shown in the FIG. 1(b) and FIG. 3(b). As is shown in the FIGS. 2 and 4, it is enlarged in the beam diameter into the directions of the axes X and Y and is emitted with a radiation angle of the optical fiber being similar to that, to be incident upon each of the cores 103a having a diameter of about 8 tm of the optical fiber bundle 103, thereby achieving an optical coupling optimized. Namely, it is possible to transmit the light emitted from the each optical element 101 with a small loss of light, by using the bundle of the optical fibers 103.

On the contrary to this, the light transmitted through the each core 103a of the optical fiber bundle 103 is incident upon the core 11a or 31 which is equal or less than about 10 $\mu$m of the optical beam-spot converter 101, by means of the optimized optical coupling, to be emitted being reduced in the beam diameter with progression in the optical beam-spot converter 101, thereby it can be received by the each optical element (light receiving element) 101.

Figure 7:
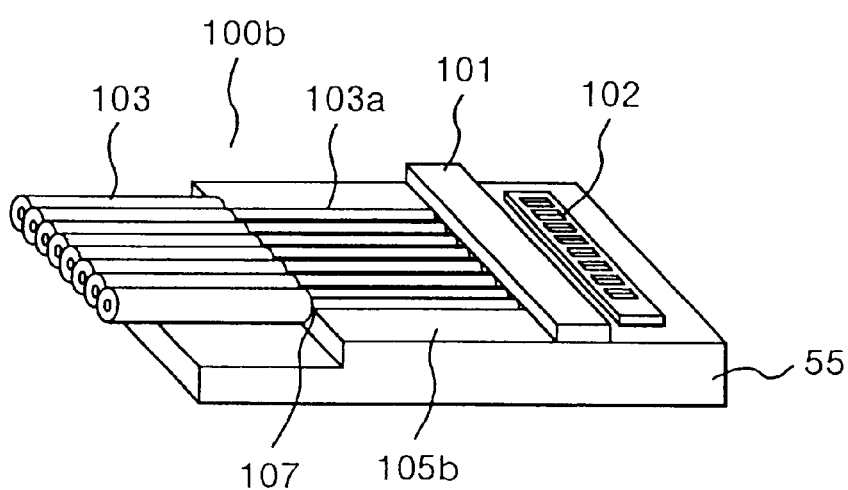
FIG. 7 shows a perspective view of a second embodiment of a parallel optical transmission module, according to the present invention.

FIG. 7 shows a concept of a second embodiment of the parallel optical transmission module, in which the optical element of allay-type according to the present invention is applied to. This differs from the first embodiment in that, on the substrate 55 being formed with the V grooves 107, the optical beam-spot converter 101 is manufactured by using the manufacturing process shown in the FIGS. 5(a)–(e), for example, so as to construct the parallel optical transmission module 100b with mounting the optical element 102 thereon. Because the substrate 55 being formed with the V grooves 107 is used, it is easy to manufacture the optical beam-spot converter 101 with use of organic materials. If using the organic materials for use in the optical wave-guide, a film can be formed by the processes of spin-coating and baking. However, it is difficult to form a flat film due to existence of the V grooves, therefore it is preferable, in the present embodiment, to apply a resist thick to be removed by etching up to the surface of the substrate, i.e., flattening by filling up the V grooves in advance. In the vicinity of the V grooves is formed an alignment mark, so as to manufacture the optical beam-spot converter 101 on the basis thereof and to form the metallizing for mounting the element(s), then it is possible to conduct a patterning with which aligning accuracy is determined by the accuracy of mask alignment, thereby achieving the optical coupling with an extremely high efficiency. The optical elements 102 are aligned with the passive alignment method and are connected with solder. Thereafter, the core 103a of the optical fiber bundle 103 is inserted into the V groove 107, and is covered by a protection plate, on which an adhesive is applied to. Then, they are cured or harden to be bonded by means of UV (Ultra-Violet ray) irradiation or heating, thereby constructing the block of the optical fiber bundle (multi-core optical connector portion) 105b with the optical beam-spot converter 101 and the optical element 102 as in a form of a single body.

As the module, of course, there are further necessitated electrical connections and sealing of the elements thereof, however since they can be achieved by applying the conventional methods thereto, or not relate to the present invention directly, therefore the explanation of them will be omitted here.

As is explained in the above, in both the first embodiment and the second embodiment in the optical transmission module 100, the designing of the optical beam-spot converter 101 is different depending upon the fact that the optical element 102 is the light emitting element or the light receiving element, however in particular, if it is in a case of the light emitting element of a beam radiation type, a remarkable improvement can be obtained on enlargement or increase in both a coupling efficiency and a tolerance when it has a function of a convex lens combining that of the enlargement and reduction of the beam spot.

Furthermore, it also can be applied to a wave-length multiplex transmit-receive module, as the optical transmission module having the optical beam-spot converter.

Figure 8:
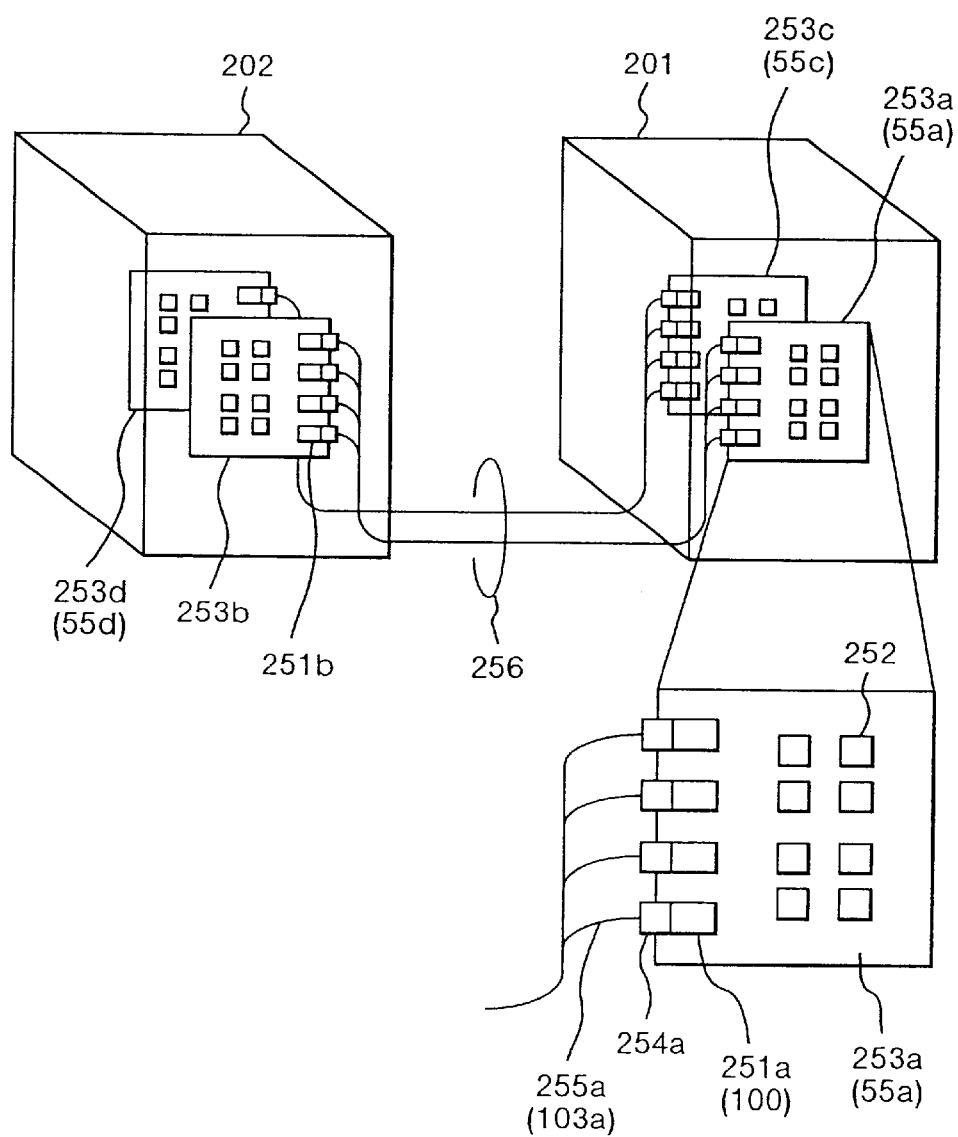
FIG. 8 shows an example of an optical transmission module, according to the present invention.

Next, an embodiment of an optical transmission system comprising exchanger(s) or a computer(s) with use of the parallel optical transmission module 100 according to the present invention will be explained by referring to the attached drawings. FIG. 8 is a block diagram of showing a relationship of signal connections in the optical transmission system comprising the exchanger(s) or the computer(s) which adopts the parallel optical transmission module according to the present invention. The present invention is applied for the purposes of light-weighting, of small-sizing in diameter, and of improvement on durability against noise, for high speed signal transmission and signal wiring of high density between the processors or between the processor and the memory device in a large-scaled computer. Namely, in the basic construction of the optical transmission system, an electric signal from an information source is converted into an optical signal at the transmission end to be transmitted through the optical fiber, and then the optical signal is turned back to the electric signal at the receiving end, again. However, it is also possible to construct the optical transmission system, in which the light is used directly from a stage of coding of the signal from the information source, so that the optical signal is amplified, transmitted and/or processed in the transmission system as a whole. Also, as a method of modulation for converting the electric signal into the optical signal may be used an intensity modulation of modulating a photoelectric power thereof. Further, as the code of the signal, in a case of a digital transmission method, binary code transmission may be used by taking the linearity of the light source into the consideration.

And, within apparatuses 201 and 202 are built up or contained substrates 253a, 253b, 253c, 253d, etc., for use in signal connection between them, and upon each of the signal connection substrates 253a (55a), 253b (55b), 253c (55c), 253d (55d) are mounted a plurality of the above-mentioned parallel optical transmission modules 251a (100) and the LSI part(s) 252, etc., as well. In the parallel optical transmission module 251a (100), the information is converted from the electric signal into the optical signal, and then is transferred through a multi-core optical connector 254 (105) to an optical fiber alley 255a (103a). Between the apparatuses, the signals are transferred through an optical fiber alley bundle 256 (103) collecting the similar optical fiber alleys. In the parallel optical transmission module 251b (100) on the signal connection substrate 253b (55b) of an other apparatus which is connected to the optical fiber alley 255a (103), the signal is converted from the optical signal into the electric signal so that it can be transmitted between the apparatuses by means of the light.

Though, in the description in the above, the signal connection substrate 253, on which the parallel optical transmission module 251 (100) and the LSI part(s) 252, etc., and the substrate 55 of constructing the parallel optical transmission module 251 (100) are explained to be constructed with the same substrate, however it is also possible to mount the substrate 55 of constructing the parallel optical transmission module 251 (100) on the signal connection substrate 253 in the actual product. In such the case, the wiring connected to the LSI part(s) on the signal connection substrate 253 and the wiring connected to the optical element 102 in the substrate 55 are necessary to be connected to each other.

According to the present invention, the optical beam-spot converter is so constructed that the beam magnification factor can be varied in the designing of the shape or configuration of the core, thereby achieving an optimal photo coupling, for example, between both ends of the optical circuit and the optical element and the respective optical fibers in the optical transmission module, which is constructed with the optical element(s), between the optical fiber(s) and the optical circuit(s) formed with the optical wave-guide(s) therebetween, and also obtaining large effects on the improvement of the utility efficiency of the light in the optical transmission module, and also on the easiness of manufacturing thereof as well.

Also, according to the present invention, the optical beam-spot converter can be manufactured with ease, thereby attributing for the low-pricing of the optical transmission module.

Further, according to the present invention, the optical beam-spot converter can be manufactured on the substrate on which the optical circuit(s) and the optical element(s) are mounted, thereby making the structure of the optical transmission module simple and easy in mounting on an actual product.

Furthermore, according to the present invention, it is possible to realize the optical beam-spot converter being able to perform the beam-spot conversion in both directions, i.e., the x and y, with an extremely simple process, thereby enabling the low-cost of the optical beam-spot converter itself, comparing to that of the conventional art which necessitates the difficult technology to be applied, such as the selective crystal growth.

And, also according to the present invention, the optical beam-spot converter is constructed with the segment-like core(s), thereby obtaining an effect of achieving the small-sizing (shortening in the element length) of the optical beam-spot converter.

What is claimed is:

1. An optical wave-guide having a z axis as an optical axis in a direction of propagation of light, an x axis in a vertical direction on a cross-section being perpendicular thereto, and a y axis in a horizontal direction, comprising:
a core portion being formed so that a light is transmitted in the direction of the z axis, around at a center of an origin of said x axis and said y axis; and
a crud layer surrounding said core portion and being lower in refractive index than that of said core portion, and being constructed with at least two layers, being different in refractive indexes thereof, which are in contact with each other on a border laying on a x coordinate in a positive or a negative region thereof but not the origin, wherein
said core portion is formed discontinuously in the direction of said optical axis.

2. An optical wave-guide having a z axis as an optical axis in a direction of propagation of light, an x axis in a vertical direction on a cross-section being perpendicular thereto, and a y axis in a horizontal direction, comprising:

a core portion being formed so that a light is transmitted in the direction of the z axis, around at a center of an origin of said x axis and said y axis; and a crud layer surrounding said core portion and being lower in refractive index than that of said core portion, and being constructed with at least two layers, being different in refractive indexes thereof, which are in contact with each other on a border laying on a x coordinate in a positive or a negative region thereof but not the origin, wherein said core portion is formed discontinuously in the direction of said optical axis, with varying a width of the core and a length of the core in the direction of the optical axis, and also a length of a portion of the core which is removed, non-cyclically.

3. An optical wave-guide as defined in the claim 1 or 2, wherein a portion of said core portion is enlarged in the direction of the y axis so as to form the core portion in a rib type.

4. An optical wave-guide as defined in the claim 1 or 2, wherein a lower portion of said core portion is enlarged in the direction of the y axis so as to form the core portion in a rib type, and a refractive index of a lower crud layer which positions at a lower portion side of the core portion is smaller than that of an upper crud layer which positions at an upper portion side of the core portion.

5. An optical wave-guide as defined in the claim 1 or 2, wherein on a cross-section of the optical axis, a core member is further provided in vicinity of the core portion, which is made of a material same to the core portion or of a material having a refractive index about similar thereto, and which is formed by extending in the direction of the y axis with a thickness being thinner than that of the core portion.

6. An optical wave-guide path as defined in the claim 1 or 2, wherein on a cross-section of the optical axis, a refractive index of a lower crud layer which positions at a lower portion side of the core portion is smaller than that of an upper crud layer which positions at an upper portion side of the core portion, and a core member is embedded into said lower crud layer in vicinity of the core portion, which is made of a material same to the core portion or of a material having a refractive index about similar thereto, and which is formed by extending in the direction of the y axis with a thickness being thinner than that of the core portion.

7. An optical transmission module comprising:
a light emitting element or a light emitting element and an optical fiber, and further comprising the optical wave-guide defined in any one of the claims 1 to 2, being provided with the light emitting element or between the light emitting element and the optical fiber.

8. An optical transmission system comprising the optical transmission module defined in claim 7, whereby an information is transmitted by means of said optical transmission module.

9. An optical beam-spot converter, including an optical wave-guide having a z axis as an optical axis in a direction of propagation of light, an x axis in a vertical direction on a cross-section being perpendicular thereto, and a y axis in a horizontal direction, comprising:

a core portion being formed so that a light is transmitted in the direction of the z axis, around at a center of an origin of said x axis and said y axis; and a crud layer surrounding said core portion and being lower in refractive index than that of said core portion, and being constructed with at least two layers, being different in refractive indexes thereof, which are in contact with each other on a border laying on a x coordinate in a positive or a negative region thereof but not the origin, wherein said core portion is formed discontinuously in the direction of said optical axis, whereby varying an optical beam-spot.

10. An optical beam-spot converter, including an optical wave-guide having a z axis as an optical axis in a direction of propagation of light, an x axis in a vertical direction on a cross-section being perpendicular thereto, and a y axis in a horizontal direction, comprising:

a core portion being formed so that a light is transmitted in the direction of the z axis, around at a center of an origin of said x axis and said y axis; and a crud layer surrounding said core portion and being lower in refractive index than that of said core portion, and being constructed with at least two layers, being different in refractive indexes thereof, which are in contact with each other on a border laying on a x coordinate in a positive or a negative region thereof but not the origin, wherein said core portion is formed discontinuously in the direction of said optical axis, with varying a width of the core and a length of the core in the direction of the optical axis, and also a length of a portion of the core which is removed, non-cyclically, whereby varying an optical beam-spot.

11. An optical beam-spot converter as defined in the claim 9 or 10, wherein on a cross-section of the optical axis, a core member is further provided in vicinity of the core portion, which is made of a material same to the core portion or of a material having a refractive index about similar thereto, and which is formed by extending in the direction of the y axis with a thickness being thinner than that of the core portion.

12. An optical beam-spot converter as defined in the claim 9 or 10, wherein on a cross-section of the optical axis, a refractive index of a lower crud layer which positions at a lower portion side of the core portion is smaller than that of an upper crud layer which positions at an upper portion side of the core portion, and a core member is embedded into said lower crud layer in vicinity of the core portion, which is made of a material same to the core portion or of a material having a refractive index about similar thereto, and which is formed by extending in the direction of the y axis with a thickness being thinner than that of the core portion.

13. An optical beam-spot converter as defined in the claim 9 or 10, wherein a portion of said core portion is enlarged in the direction of the y axis so as to form the core portion in a rib type.

14. An optical beam-spot converter as defined in the claim 9 or 10, wherein a lower portion of said core portion is enlarged in the direction of the y axis so as to form the core portion in a rib type, and a refractive index of a lower crud layer which positions at a lower portion side of the core portion is smaller than that of an upper crud layer which positions at an upper portion side of the core portion.

15. An optical transmission module comprising:
a light emitting element or a light emitting element and an optical fiber, and further comprising the optical beam-spot converter defined in any one of the claims 9 to 10, being provided with the light emitting element or between the light emitting element and the optical fiber.

16. An optical transmission system comprising the optical transmission module defined in claim 15, whereby an information is transmitted by means of said optical transmission module.

* * * * *